UNITED STATES PATENT OFFICE.

BERNARD HERMAN BERTELS, OF AMSTERDAM, NETHERLANDS.

CATTLE FOOD.

989,478.  Specification of Letters Patent.  Patented Apr. 11, 1911.

No Drawing.  Application filed June 13, 1907. Serial No. 378,858.

*To all whom it may concern:*

Be it known that I, BERNARD HERMAN BERTELS, agriculturist and manufacturer, a subject of the Queen of the Netherlands, residing at T'Huis de Hinde, Amsterdam, Netherlands, have invented new and useful Improvements in Cattle Foods, of which the following is a specification.

My invention relates to a new food-mixture for animals, more particularly for horses and other beasts of draft, and to the method of preparing the same.

In preparing the improved food, I add to a mixture of suitable food-materials—for instance, of hay of desirable descriptions, oats, horse-beans, linseed, disintegrated or pulverized, and molasses, etc.—a drying vegetable oil (*e. g.* linseed oil) in the hot and while suitably mingling, so that during the agitation of the mass at a high temperature the linseed oil added, becoming thoroughly liquid through the heat, impregnates the various ingredients of the mixture or coats them over. In this manner the food-mixture (whose ingredients are so selected in respect to nature and quantity as to constitute a perfect or complete food) are rendered stable, since the linseed oil makes the mass unhygroscopic, thus preventing the formation of mold. The food-mixture is thus rendered stable without having necessarily to be pressed. The linseed oil also fulfils the purpose of making the fodder more digestible, and owing to its increasing the percentage of fat and to its other properties, it acts extremely beneficially on the organism of the animals.

According to my invention, as already mentioned, there is no necessity at all to apply pressure with a view to impregnating or coating over the solid constituents of the mixture, since for these purposes the addition of linseed oil in the hot is sufficient. If according to my invention, I employ pressure also, it need only be such as is requisite to agglomerate ingredients of the mixture, since it has no other function to fulfil.

In my new process I impregnate or coat the ingredients of the mixture in the hot, for the purpose of obtaining a really stable final product. Foods containing water do not keep, and to dry them, apart from the trouble, would not have the effect of rendering them stable.

To prepare, for example, a provender for horses, my invention is carried out in the following manner:—The best sorts of clover hay, or lucerne hay, vetch hay, and meadow hay, are ground to meal by means of special machinery. Oats, beans, and linseed cake are likewise each ground separately to meal. To the hay meal, of which about 35 parts are taken, there is then added of the other meals: about 10 parts oat meal, about 5 parts horse-bean meal, and about 2½ parts linseed meal, the whole being intimately mixed or ground together in any suitable manner, in the cold, 7½ parts molasses being also run into the mixture. In a few minutes an almost dry, mealy mixture is obtained, which is conducted automatically to a mixing machine, capable of being heated, and in which the mass is brought, with the addition of about 1½ parts vegetable oil (*e. g.* linseed oil) to a temperature of about 110° Cent. The mass is then run off and allowed to cool, whereupon it is ready for use and thoroughly stable. The mixture can, however, be conducted from the mixing machine to a special automatic press, suited for this purpose, in order to produce a permanently dry and stable, solid cake or block food for cattle or horses, which will keep for any length of time.

The preparation, specially of a compressed, perfect or complete fodder, which in a compact mass contains in addition to oats and hay, sufficient albumen, fat, carbohydrates, raw fibers, phosphoric acid and lime, organically combined, is most important for military purposes, particularly if the food-mixture is of small bulk. It is well known that a horse fed on the ordinary oat and hay provender receives less albumen and fat than is requisite for rational feeding; whereas a food prepared according to my invention contains the percentages of fat and albumen which science demands, and in addition thereto contains almost double the quantity of phosphoric acid and lime, organically combined, contained in other foods, which is of great importance, especially for bone-forming. Furthermore, the food prepared according to my invention is cheaper than oats of considerably less nutritive value.

Having thus described my invention, I claim:

1. The process of preparing a balanced ration for cattle consisting in reducing a mixture of suitable forage food materials to a fine state of division and intimately mingling the elements of the mixture of suitable food materials by grinding together and at the same time mixing therewith molasses in the cold in proportions to make a dry mealy mixture, adding a siccative vegetable oil while simultaneously heating the mixture to a temperature of about 110° C. and agitating the same and then allowing said mixture to cool.

2. The process of preparing a balanced ration for cattle consisting in reducing a mixture of suitable forage food materials to a fine state of division and intimately mingling the elements of the mixture of suitable food materials by grinding together and at the same time mixing therewith molasses in the cold in proportions to make a dry mealy mixture, adding linseed oil while simultaneously heating the mixture to a temperature of about 110° C. and agitating the same and then allowing said mixture to cool.

3. The process of preparing a balanced ration for cattle consisting in reducing separately a mixture of suitable forage food materials to a state of fine division, intimately mingling the elements of the mixture by grinding together, and at the same time mixing therewith molasses in the cold in proportions to make a dry mealy mixture, heating the mixture to a temperature of about 110° C. and adding linseed oil and the like during such latter treatment and subsequently pressing the mass into the form of cakes.

4. The process of preparing a balanced ration for cattle consisting in reducing a mixture of suitable forage food materials to a finely divided state, intimately commingling the same by grinding, simultaneously adding thereto molasses in the cold in proportions to make a dry mealy mixture, adding to this mass a siccative vegetable oil and heating the mass simultaneously with the addition of said oil thereto to a temperature of about 110° C. whereby the individual elements will become enveloped by the oil and rendered unhydroscopic agitating the mixture and finally allowing it to cool.

In witness whereof I have hereunto signed my name this 31st day of May, 1907, in the presence of two subscribing witnesses.

BERNARD HERMAN BERTELS.

Witnesses:
   FELIN HEOP,
   AUGUST SIEGFRIED DOCEN.